3,649,582
REINFORCED THERMOPLASTIC CARBOXY ACID
COPOLYMER LATEX COMPOSITIONS
George L. Wesp, Ballwin, Mo., assignor to Monsanto
Company, St. Louis, Mo.
No Drawing. Filed Oct. 13, 1969, Ser. No. 866,042
Int. Cl. C08f 45/24
U.S. Cl. 260—29.6 N                                29 Claims

ABSTRACT OF THE DISCLOSURE

Reinforced compositions are made from a thermoplastic latex copolymer of an unsaturated free-radical polymerizable non-acidic monomer and an unsaturated free-radical polymerizable carboxy acid, an aminosilane coupling agent and a siliceous reinforcing material. A process for making the compositions and forming them into useful structural and decorative articles is also disclosed.

BACKGROUND OF THE INVENTION

The present invention relates to reinforced thermoplastic compositions which can be formed into articles that exhibit high strength properties when used under both dry and moist conditions. A principal feature of this invention relates to useful objects having complex shapes which may be made from these compositions by a range of techniques. Another feature is the combination of components of the composition which results in uniform distribution of the coupling agent throughout the composition as well as the high strength properties of the formed composition. Still another feature of this invention is the use of a latex polymer as a base resin to make a high performance reinforced plastic composition.

Compositions comprising thermoset resins and fibrous reinforcement which can be made into objects with high strength and toughness are known. Composites comprising thermoplastic resins and fibrous and particulate reinforcement which can be molded or cast into a variety of objects are known. Although such thermoplastic composites can be shaped into many decorative useful objects by low cost fabricating techniques, their strength characteristics are so far below those of the thermoset composites that the thermoplastic composites cannot be considered for many structural applications. Rather thermoplastic composites are limited to such applications as floor and wall coverings, countertops, automotive duct work and decorative parts, small industrial items, and a miscellany of furniture components. There is a wide range of applications in the construction, automotive, and general industrial supply industries which could utilize plastic composites if they exhibited the strength of thermoset composites yet retained the fabrication economies and the postformability of thermoplastic composites. The products of this invention meet this long-standing industry need.

Certain shapes and designs are difficult to form even from reinforced thermoplastic compositions where extensive plastic flow is needed to make intricate details of the formed part. This is particularly true where high levels of reinforcement are used. A known method to overcome the difficulties is to first fabricate a pre-form by hand lay up methods. However, this extra operation is costly and time consuming. A process which could rapidly and economically produce a pre-form for such intricate shapes would open up new fields of use for reinforced thermoplastic compositions.

The use of a latex polymer as a base resin for reinforced thermoplastics has been limited because of the low strength properties of such compositions particularly under moist use conditions. The various surfactants and additives used to stabilize the latex make the reinforced thermoplastic compositions made from the latex sensitive to moisture. As a result, the only commercially significant reinforced thermoplastic compositions found today are those compositions which combine a melted thermoplastic or a polymer which is formed in situ with a particulate or fibrous reinforcing agent. If the use of latex polymers as base resins for reinforced thermoplastics is to become significant, a new process to make such compositions is needed which will overcome the moisture sensitivity and low strength properties of known compositions.

If the coupler could be dispersed in the liquid phase of the thermoplastic resin prior to contact with the reinforcing material, improved distribution would result. Present approaches have met with only limited success. Consequently higher than necessary levels of coupler must be used to be certain that sufficient coupler is provided for effective coupling throughout the composition.

SUMMARY OF THE INVENTION

The reinforced compositions of this invention comprise a thermoplastic latex copolymer of an unsaturated free-radical polymerizable non-acidic monomer and an unsaturated free-radical polymerizable carboxy acid, an aminosilane coupling agent and a siliceous reinforcing material. The process of this invention comprises combining a latex copolymer of an unsaturated free-radical polymerizable non-acidic monomer and an unsaturated free-radical polymerizable carboxy acid, an aminosilane coupling agent, and a siliceous reinforcing material, drying said combined materials, and forming with heat and pressure said combined materials into a fused composition.

DESCRIPTION OF THE PREFFERED EMBODIMENTS

The term *thermoplastic latex copolymer* as used herein relates to an emulsion of polymerized particles in aqueous media, which polymerized particles have the capability of being softened by heat and, upon cooling, of regaining their original properties.

An unsaturated free-radical polymerizable non-acidic monomer is any organic compound which contains no —COOH group but contains unsaturation between adjacent carbon atoms, by means of which unsaturation a polymer can be formed through the mechanism of a free-radical reaction.

Illustrative examples of an unsaturated free-radical polymerizable non-acidic monomer include but are not limited to the following: styrene, alpha-methyl styrene, vinyl toluene, chlorostyrenes, dichlorostyrenes, acenaphthylene, acrylonitrile, methacrylonitrile, butadiene, isoprene, chloroprene, vinyl acetate, vinyl chloride, vinylidene chloride, ethylene, vinyl fluoride, vinylidene fluoride, tetrafluoroethylene, methyl methacrylate, methyl acrylate, ethyl acrylate, and the like. In forming the copolymers of this invention such monomers may be used alone or in various combinations of monomers. The proportion of monomer amounts in the combination depends on the polymer properties desired. Examples of such combinations include but are not limited to the following: styrene-acrylonitrile, styrene-methyl methacrylate, styrene butadiene, acrylonitrile-butadiene-styrene, acrylonitrile-butadiene, vinyl acetate-vinyl chloride, ethylene-vinyl acetate, ethylene-vinyl chloride, chloroprene-acrylonitrile, and the like. More preferred unsaturated free-radical polymerizable non-acidic monomers and combinations of monomers include: styrene, acrylonitrile, butadiene, vinyl acetate, vinyl chloride, ethylene, methyl methacrylate, ethyl acrylate, styrene-acrylonitrile, acrylonitrile-butadiene-styrene, vinyl acetate-vinyl chloride, ethylene-vinyl acetate, and ethylene-vinyl chloride. Still more preferred are styrene, methyl methacrylate and styrene-acrylonitrile.

An unsaturated free-radical polymerizable carboxy acid is any organic compound which contains a —COOH group as well as an unsaturation between adjacent carbon atoms by means of which unsaturation a polymer can be formed through the mechanism of a free-radical reaction. Illustrative examples of an unsaturated free-radical polymerizable carboxy acid include but are not limited to the following: methacrylic acid, acrylic acid, itaconic acid, phenyl crotonic acid, mono esters of fumaric acid, mono esters of maleic acid and the like. Particularly good results may be obtained with methacrylic acid, a mono ester of fumaric acid and a mono ester of maleic acid.

Any proportion of unsaturated free-radical polymerizable non-acidic monomer to unsaturated free-radical polymerizable carboxy acid may be used so long as there is a detectable number of carboxyl groups available for reaction with the aminosilane coupling agent after preparation of the latex. The moisture sensitivity of the finished composite varies directly with the level of unsaturated free-radical polymerizable carboxy acid present in the latex. In view of this relation, to achieve a composite with maximum strength and minimum moisture sensitivity, it is preferred that the latex contain from about 0.5 percent to about 10 percent by weight of unsaturated free-radical polymerizable carboxy containing acid based on polymer solids. A more preferred range is from about 1 percent to about 5 percent. A still more preferred range is from about 1.5 percent to about 3 percent.

For some structural applications demanding the ultimate in strength of the composite it may be preferable that the latex copolymer have a glass transition temperature ($T_g$) of at least 100° C.

An aminosilane coupling agent includes any water-soluble, amino-functional silane ester or any amino-substituted alkyl silane ester which forms silane linkages with siliceous reinforcing materials. Preferred aminosilane coupling agents may be described by the following formula:

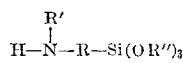

wherein R is $(CH_2)_n$ and $n$ is an integer from 1 to 6, R' is hydrogen, an aliphatic group such as $CH_3(CH_2)_m$ where $m$ is an integer from 0 to 12; an aromatic group such as a phenyl group, a phenyl group substituted with one or more alkyl groups, or a naphthyl group; or an alkylene amino group containing from 1 to 10 carbon atoms, and R" is an alkyl group such as $CH_3(CH_2)_p$ where $p$ is an integer from 0 to 3.

Illustrative examples of an aminosilane coupling agent include but are not limited to the following: 3-aminopropyl triethoxysilane, N - trimethoxysilylpropyl-N($\beta$-aminoethyl) amine, N-trimethoxysilylundecyl amine and the like.

The use of aminosilane coupling agents in even very small amounts, as little as only a few parts per million based on weight of reinforcing material, results in a surprising improvement in strength properties of reinforced compositions. Likewise large quantities, as much as 5 percent by weight based on reinforcing material or more are also quite useful although such high levels of coupler raise costs significantly. Preferably the aminosilane coupling agent is present in the amount of from about 0.01 to about 3 parts by weight per 100 parts by weight of siliceous reinforcing material. More preferably it is present in the amount of from about 0.1 to about 2 parts per hundred siliceous reinforcing material. Still more preferably it is present in the amount of from about 0.2 to about 1 part per hundred.

A siliceous reinforcing material includes any inorganic material containing a

reactive group or having the capability of forming a

reactive group. Illustrative examples of such siliceous reinforcing materials include but are not limited to the following: a variety of calcined and uncalcined clays such as montmorillonite, kaolinite, bentonite, hectorite, beidellite and attapulgite; other mineral salts of silica such as chrysolite, saponite, feldspar, quartz, wollastonite, mullite, kyanite, amosite, cristobalite, chrysotile, crocidolite, mica, spodumene and garnet; siliceous non-mineral substances such as silica gel, fumed silica, fibrous aluminum silicate and glass fibers and flakes. A siliceous reinforcing material may be present in the compositions of this invention, in fibrous form, particulate form or as a combination of particles and fibers. The dimensions of particles and fibers are not critical so long as a dimension of the siliceous reinforcing material is less than about 0.05 inch. A preferred embodiment with very high strength uses siliceous reinforcing fibers from about 0.1 inch to about 1 inch in length. A preferred embodiment with high strength uses siliceous reinforcing material comprising from about 10 percent by weight to about 90 percent by weight particulate material and from about 90 percent by weight to about 10 percent by weight fibrous material. Asbestos in fibrous form is a siliceous reinforcing material particularly suited to the process of this invention.

A composition produced by the process of this invention comprises from about 10 percent by weight to about 90 percent by weight thermoplastic polymer solids and from about 90 percent by weight to about 10 percent by weight siliceous reinforcing material. Preferably the composite comprises from about 20 percent by weight to about 80 percent by weight thermoplastic polymer solids and from about 80 percent by weight to about 20 percent by weight siliceous reinforcing material. More preferably the polymer content ranges from about 30 percent to about 70 percent polymer solids and reinforcing material from about 70 percent to about 30 percent.

The coupling agents useful in the process of this invention are soluble in water. Since the thermoplastic polymers of the invention are dispersed in water, the coupling agent in a preferred embodiment may be uniformly dispersed by directly adding the coupling agent to the latex with no need for additional water to be added to the system to predisperse the coupling agent. In this fashion, the volatile content of the system may be minimized without adversely affecting the uniformity of dispersion. If keeping volatile content low is not a desired object, the coupling agent may be predispersed in water and the coupling agent solution added to the latex, the reinforcing material or a mixture of the two.

The coupling agents of this invention when dissolved in water and mixed with a siliceous reinforcing material exhaust on the reinforcing material and remain with it when the water is removed rather than remaining in solution in the water. This remarkable feature gives the process great versatility in the water removal step and enlarges the utility of the process for making a wide variety of shapes and designs. Thus, the raw material components can be mixed together to form a combination of a heavy doughy consistency or a readily pourable slurry. The compositions produced by either variation of the process are equally strong and useful. Thus the method of combining the thermoplastic latex and the siliceous reinforcing material is not critical. The coupling agent may be added to the thermoplastic latex or to the siliceous reinforcing material before the latex and reinforcing material are combined. Also the coupling agent may be added to the combined latex and reinforcing material. In a preferred embodiment in which the coupling agent is added to the latex before the latex is combined with the reinforcing material, a composite having very high strength properties is obtained. In a preferred embodiment in which the coupling agent is added to the reinforcing material before the latex is combined with the reinforcing material, a composite having good strength properties is obtained. The thermoplastic latex and the siliceous reinforcing material may be combined in a variety of procedures which are illustrated by, but not limited to, the following:

(1) Dissolve coupling agent in latex. Preform reinforcing material into a shape. Impregnate shaped reinforcing material with combined latex and coupling agent.

(2) Dissolve coupling agent in water. Combine solution with latex. Preform reinforcing material into a shape. Impregnate shaped reinforcing material with combined latex and coupling agent.

(3) Mix together latex, coupling agent and reinforcing material to give a generally uniform mass having the approximate consistency of dough or putty.

(4) Mix together latex, a coupling agent dissolved in water and reinforcing material to give a generally uniform mass having the approximate consistency of dough or putty.

(5) Suspend reinforcing material in water. Add latex and coupling agent. Coagulate the latex. Remove excess water leaving a mixture of latex solids, coupling agent and reinforcing material (hereinafter referred to as "wet-leaf" process).

(6) Repeat wet-leaf process a number of times using differing proportions of latex, coupling agent and reinforcing material to build up a laminar composition.

To produce compositions by the process of this invention, the volatile portion of the raw materials must be removed which volatile removal step is referred to herein as "drying." Drying can be a separate step in the process or may be combined with the forming step. Drying may take place from about ambient room temperature to about the fusion temperature of the thermoplastic. Drying may be accomplished by evaporation, draining, draining assisted by vacuum, positive pressurized dewatering, centrifuging, absorption, or by other means. Any one of the methods used for drying may be used by itself or in combination with one or more other methods. Drying may be carried out at a single temperature or over a range of temperatures. Drying may be carried out at, above, or below atmospheric pressure. Drying may be accomplished in a few seconds, as in a high temperature bake oven or vented mold, or drying may take several days as where preforms are allowed to remain at room temperature while volatiles evaporate or drain off. In short, the actual drying process is not critical so long as volatiles are removed when forming is completed.

Forming into decorative items such as art objects and useful items such as automotive and industrial structural parts may be carried out by any of the conventional thermoplastic forming techniques such as extrusion, injection, matched-metal and transfer molding and calendering. The composition may be formed, from a dry powder, a shapeless mass of dough-like consistency, or a moist preform as produced by the wet leaf process. When using a feedstock of high moisture content, equipment designs must provide proper venting by known techniques to allow for release of volatiles as generated. The reinforced thermoplastic compositions of this invention have lower flow than the same thermoplastics without reinforcement. This lower flow characteristic is also taken into consideration when designing forming equipment and can be dealt with by conventional techniques such as open-gating, higher pressures, etc.

Although the theoretical aspects of this invention are not completely understood, the following hypotheses may be an explanation of why the remarkable strengths are obtained in objects made from compositions by the process of this invention. The aminosilane coupling agents are soluble in water and have an electropositive charge. The siliceous reinforcing materials are electronegative. The water-solubility of the coupling agents allows them to be uniformly dispersed throughout the latex and reinforcing material slurry. The attractive electrical forces cause the coupling agent to exhaust onto the reinforcing material and water may be removed from the system with only minimal losses of coupling agent. During the forming operation it is postulated that the following reactions take place:

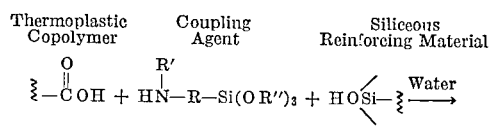

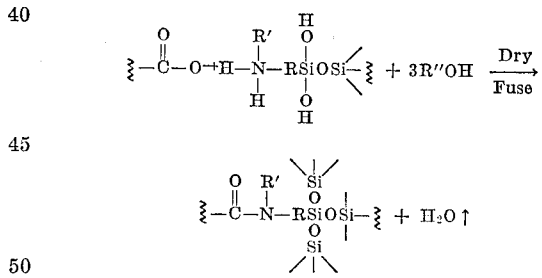

The chemical reaction between the thermoplastic copolymer, coupling agent and siliceous reinforcing material is not complete until after the composition is fused. To fuse is to heat the mixture above its softening point to a temperature at which the solid copolymer particles coalesce and are capable of some viscous flow under load. Preferably the temperature is above 100° C. Thus it is theorized that a true chemical covalent bond is formed by the coupling agent with the thermoplastic copolymer and the siliceous reinforcing material. That the

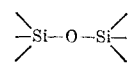

linkage does not hydrolyze in water probably accounts for the high strength of compositions under moist conditions. The uniform dispersion of the coupling agent in water, the minimal loss of coupler upon removal of water, and the true chemical covalent bond between coupler and thermoplastic copolymer and siliceous reinforcing material are believed to be the reasons for the high strength properties of these compositions at minimum coupling agent levels. Of course it is recognized that there are other possible theories which could explain the high strength properties of the compositions of this invention and which may be devised in the future. However, the invention lies in the fact that the properties can be obtained in the compositions of this invention without any special additional process steps and not in the theoretical explanation of the basis for such high strength properties.

The invention will be more clearly understood from a detailed description of the following specific examples which set forth some of the preferred compositions, methods for their preparation, and some of the advantages attained by the practice of this invention. Quantities of materials are expressed in parts by weight except as otherwise specifically noted.

EXAMPLES 1 TO 6

These examples illustrate the remarkable improvement in strength and stiffness of compositions of this invention made by pre-dispersing the coupling agent in water, mixing with a carboxyl containing latex and then adding a variety of fibrous reinforcing materials as compared to similar compounds of the prior art. Properties measured are summarized in Table 1A.

EXAMPLE 1

To 100 milliliters of water are added, 0.225 gram of 3-aminopropyl triethoxysilane and 101.3 grams of a 29.7 percent solids emulsion-polymerized latex of a terpolymer of 72 parts of styrene, 28 parts of acrylonitrile and 2 parts of methacrylic acid (polymer $\eta$ sp.=0.08 for a 0.1 percent solution in dimethyl formamide at 23° C.). This mixture and 45 grams of crocidolite asbestos of 0.5 to 1 inch fiber length are spatulated for about five minutes and spread as a 0.25" thick cake on a chromium plated steel plate and air dried for 5 hours at 120° C. The dry cake is then placed in a 4 inch by 4 inch by ½ inch deep mold cavity and pressed for 2 minutes at 180° C. and 3770 pounds per square inch. The resulting sheet is then cut into 0.5 inch wide strips for evaluation of mechanical properties.

EXAMPLE 2

The procedure of Example 1 is followed except that no 3-aminopropyl triethoxysilane is incorporated into the composition.

EXAMPLE 3

The procedure of Example 1 is followed except that amosite asbestos is used in place of crocidolite asbestos.

EXAMPLE 4

The procedure of Example 3 is followed except that no 3-aminopropyl triethoxysilane is incorporated into the composition.

EXAMPLE 5

The procedure of Example 1 is followed except that 4T4 chrysotile asbestos is used in place of crocidolite asbestos and 85.8 grams of a 35 percent solids emulsion polymerized latex of a terpolymer of 72 parts of styrene, 28 parts of acrylonitrile and 2 parts of methacrylic acid (polymer $\eta$ sp.=0.27 for a 0.1 percent solution in dimethyl formamide at 23° C.) is used in place of 101.3 grams of 29.7 percent solids latex.

EXAMPLE 6

The procedure of Example 5 is followed except that no 3-aminopropyl triethoxysilane is incorporated into the composition.

EXAMPLES 7 TO 9

These examples illustrate the high level of strength and stiffness of compositions of this invention made by a number of variations in procedure. Properties measured are summarized in Table 1B.

EXAMPLE 7

This example illustrates a "wet-leaf" process. To a slurry of 90 grams of 4T4 chrysotile asbestos in 4 liters of water containing 0.45 gram of 3-aminopropyl triethoxy silane is added 202.5 grams of the carboxyl-containing latex of Example 1. While stirring at 1700 revolutions per minute with a 2 inch diameter 3 bladed propeller for 10 minutes, the aqueous phase becomes clear indicating that the latex polymer particles are agglomerated and adhered to the asbestos fiber. The slurry is then dewatered by filtering with suction on a 24 centimeter diameter sheet filter paper in a Buchner funnel. The filter paper is stripped from the wet cake and the cake is further dewatered by pressing at 200 pounds per square inch. After drying at 185° C. for 15 minutes the cake is then pressed at 310 pounds per square inch and 180° C. for 2 minutes. The resulting sheet is then cut into 0.5 inch wide strips for evaluation of mechanical properties.

EXAMPLE 8

150 grams of crysotile asbestos is placed in a 2 liter flask fitted with a "Trubore" stirrer and flushed with nitrogen for 0.5 hour. The flask is then heated to 150° C. with the stirrer operating and 0.75 gram of 3-aminopropyl triethoxy silane introduced with a syringe. After 0.5 hourt at 150° C. the flask contents are cooled at 250° C., while purging with $N_2$. The treated fibers are then mixed with a carboxyl-containing latex and are formed into a composition of this invention according to the procedure of Example 5.

EXAMPLE 9

Chryostile asbestos, treated according to the procedure of Example 8 made into a slurry and formed into a composition of this invention according to the procedure of Example 7.

EXAMPLE 10

This example illustrates the use of a combination of particulate and fibrous fillers in the practice of this invention. The procedure of Example 1 is followed except that in Run 10a 30 percent of the asbestos is replaced by ground wollastonite (P–1 Cabolite-Cabot Corp.) in Run 10b 50 percent of the asbestos is replaced by ground wollastonite, and in Run 10c 70 percent of the asbestos is replaced by ground wollastonite. Properties measured are summarized in Table 1C.

EXAMPLE 11

This example illustrates the use of particulate fillers in the practice of this invention. A series of compositions are made according to the procedure of Example 1 except that in place of the 45 grams of crocidolite asbestos filler 45 grams of one of the following particulate fillers are used to make a composition:

(a) kaolinite
(b) bentonite
(c) fumed silica and
(d) silicon carbide
(e) wollastonite In each case the mechanical properties of the composition are determined, compared to those of a composition which is the same except that it contains no coupling agent, and found to show about a 40 percent higher flexural strength and flexural modulus than the corresponding uncoupled composition.

EXAMPLE 12

This example illustrates the use of a variety of aminosilane coupling agents in the practice of this invention. A series of compositions are made according to the procedure of Example 1 except that in place of 0.225 gram of 3-aminopropyl triethoxysilane 0.225 gram of coupling agent Ⓐ and coupling agent Ⓑ are each used to make a compound.

TABLE 1

| Example No. | Reinforcing type | Material, percent | Coupling agent present | Flexural strength, p.s.i. | Flexural modulus p.s.i.×10⁻⁶ |
|---|---|---|---|---|---|
| | | 1A | | | |
| 1 | Crocidolite | 60 | Yes | 25,100 | 2.8 |
| 2 | do | 60 | No | 13,700 | 1.6 |
| 3 | Amosite | 60 | Yes | 14,500 | 2.1 |
| 4 | do | 60 | No | 10,700 | 1.6 |
| 5 | Chrysotile | 60 | Yes | 14,000 | 1.4 |
| 6 | do | 60 | No | 9,900 | 1.1 |
| | | 1B | | | |
| 7 | Chrysotile | 60 | Yes | 18,600 | 1.8 |
| 8 | do | 60 | Yes | 14,200 | 1.6 |
| 9 | do | 60 | Yes | 13,900 | 1.8 |
| | | 1C | | | |
| 1 | Crocidolite | 60 | Yes | 25,100 | 2.8 |
| 10a | {Crocidolite / Wollastonite} | {42 / 18} | Yes | 18,600 | 2.2 |
| 10b | {Crocidolite / Wollastonite} | {30 / 30} | Yes | 17,100 | 1.9 |
| 10c | {Crocidolite / Wollastonite} | {18 / 42} | Yes | 17,000 | 1.8 |
| 2 | Crocidolite | 60 | No | 13,700 | 1.6 |
| | | 1D | | | |
| 13 | Crocidolite mat | 50 | Yes | 33,000 | 2.2 |
| 14 | Crocidolite | 50 | Yes | 21,900 | 1.6 |

Ⓐ N-trimethoxysilylpropyl-N(β-aminoethyl) amine
Ⓑ N-trimethoxysilylundecyl amine In both cases the strength and stiffness of each compound shows approximately the same levels as the composition of Example 1.

EXAMPLES 13 AND 14

These examples illustrate the difference in strength and stiffness of a composition of this invention made by impregnation of performed reinforcing material by a combination of coupling agent and carboxyl-containing latex and a similar composition made from a fiber/latex paste.

EXAMPLE 13

A quantity of 0.06 gram of 3-aminopropyl triethoxysilane coupling agent is added to 37 grams of a 32.4 percent solids emulsion-polymerized latex of a copolymer of 98 parts of methylmethacrylate and 2 parts of methacrylic acid. After stirring, the mixture is poured on to a 6⅞ inch by 10 inch crocidolite asbestos mat weighing 12 grams. The asbestos mat absorbs the entire mixture. The wet mat is squeezed and smoothed gently, folded in one-half and dried for 2 hours at 70° C. in a forced air oven. The dried mat is compression molded in ⅛ inch thick templates from which test specimen are cut. Properties measured are summarized in Table 1D.

EXAMPLE 14

Into a one liter beaker the following are added in sequences as listed:

0.175 grams of 3-aminopropyl trimethoxysilane in 50 milliliters of water,
108.0 grams of a 32.4 percent solids emulsion-polymerized latex of a copolymer of 98 parts of methyl methacrylate and 2 parts of methacrylic acid, and
35.0 grams of "Blue" crocidolite long fibered asbestos.

The mix is spatulated for 5 minutes, placed on a petroleum jelly lubricated press polish plate, and dried overnight at 70° C. in a forced air oven. The dried mix is then compression molded in ⅛ inch thick templates from which test specimens are cut. Properties measured are summarized in Table 1D.

EXAMPLE 15

This example illustrates the use of a variety of copolymers in the practice of this invention. A series of compositions are made according to the procedure of Example 1 except that in place of 101.3 grams of a 29.7 percent solids emulsion-polymerized latex of a terpolymer of 72 parts of styrene, 28 parts of acrylonitrile and 2 parts of methacrylic acid 100 grams of a 30 percent solids emulsion-polymerized latex having a composition as follows is used.

(a) 72 parts styrene, 28 parts acrylonitrile, 2 parts acrylic acid
(b) 72 parts styrene, 28 parts acrylonitrile, 2 parts itaconic acid
(c) 72 parts styrene, 28 parts acrylonitrile, 2 parts monomethyl ester of fumaric acid
(d) 72 parts styrene, 28 parts acrylonitrile, 2 parts monoethyl ester of maleic
(e) 98 parts methyl methacrylate, 2 parts monoethyl ester of maleic acid
(f) 98 parts styrene, 2 parts methacrylic acid
(g) 60 parts styrene, 25 parts acrylonitrile 15 parts butadiene, 2 parts methacrylic acid.

The mechanical properties of each of the above 7 compositions are determined, compared to properties of corresponding compositions which are the same except that they contain no coupling agent, and found to show about a 40 percent higher flexural modulus and flexural strength than the corresponding uncoupled composition. The $T_g$ of composition (g) is slightly lower than that of the other compositions due to the presence of butadiene in the thermoplastic copolymer latex.

EXAMPLE 16

This example illustrates the lower improvement in strength level of a composition using a coupling agent other than an amino-silane coupling agent. The procedure of Example 1 is followed except that in place of 3-aminopropyl triethoxysilane 0.225 gram of methacryloxy propyl trimethoxysilane are used. The flexural strength is 16,000 pounds per square inch. The flexural modulus is $1.8 \times 10^6$ pounds per square inch. Although the flexural strength and flexural modulus are about 15 percent higher than the same composition without any coupling agent, the properties are substantially below the level measured for the composition of Example 1. Compositions are also prepared according to the procedures of Example 3 and Example 5 except that in place of the aminosilane coupling agent, 0.225 grams of methacryloxy propyl trimethoxysilane are used. Similar differences in property levels are noted.

I claim:

1. A composition consisting essentially of from about 10 to about 90 percent by weight of polymer solids of a thermoplastic latex copolymer of an unsaturated free-radical polymerizable nonacidic monomer and an unsaturated free-radical polymerizable mono-carboxy acid, said acid being present in said latex in the amount of from about 0.5 to about 10 percent by weight based on polymer solids, from about 90 percent to about 10 percent by weight siliceous reinforcing material, and from a few parts per million to about 5 percent by weight of an aminosilane coupling agent dissolved in water.

2. The composition of claim 1 wherein the non-acidic monomer is monomer selected from the group which consists of styrene, alpha-methyl styrene, vinyl toluene, chlorostyrene, dichlorostyrene, acenaphthylene, acrylonitrile, methacrylonitrile, butadiene, isoprene, chloroprene, vinyl acetate, vinyl chloride, ethylene, vinylidene chloride, vinyl fluoride, vinylidene fluoride, tetrafluoroethylene, methyl methacrylate, ethyl acrylate, and methyl acrylate.

3. The composition of claim 1 wherein the non-acidic monomer is a combination of monomers selected from the group which consists of styrene-acrylonitrile, styrene-methyl methacrylate, styrene-butadiene, acrylonitrile-butadiene-styrene, acrylonitrile-butadiene, vinyl acetate-vinyl chloride, ethylene-vinyl acetate, ethylene-vinyl chloride, and chloroprene-acrylonitrile.

4. The composition of claim 1 wherein the unsaturated free-radical polymerizable mono-carboxy acid is selected from the group which consists of methacrylic acid, acrylic acid, itaconic acid, phenyl crotonic acid, a monoester of fumaric acid, and a monoester of maleic acid.

5. The composition of claim 1 wherein the unsaturated free-radical polymerizable mono-carboxy acid is present in the amount of from about 1 to about 5 percent by weight of the polymer solids.

6. The composition of claim 1 wherein the thermoplastic latex copolymer has a glass transition temperature of at least 100° C.

7. The compostion of claim 1 wherein the coupling agent has the formula

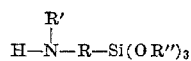

wherein R is $(CH_2)_n$ and $n$ is an integer from 1 to 6, R' is selected from the group which consists of hydrogen, $CH_3(CH_2)_m$ where $m$ is an integer from 0 to 12, a phenyl group, a phenyl group substituted with an alkyl group, a phenyl group substituted with a naphthyl group and an alkylene amino group containing from 1 to 10 carbon atoms, and R'' is $CH_3(CH_2)_p$ where $p$ is an integer from 0 to 3.

8. The composition of claim 1 wherein the coupling agent is selected from the group which consists of 3-aminopropyl triethoxysilane, N-trimethoxysilylpropyl amine - N(β - aminoethyl) amine and N-trimethoxysilyl-undecyl amine.

9. The composition of claim 1 wherein the coupling agent is present in the amount of from about 0.01 to about 3 parts by weight per 100 parts by weight of siliceous reinforcing material.

10. The composition of claim 1 wherein the siliceous reinforcing material has a dimension less than about 0.05 inch.

11. The composition of claim 1 wherein the siliceous reinforcing material is in fibrous form having fibers from about 0.1 to about 1 inch in length.

12. The composition of claim 1 wherein the siliceous reinforcing material is in particulate form.

13. The composition of claim 1 wherein the siliceous reinforcing material comprises from about 10 to about 90 percent by weight particulate material and from about 90 percent to about 10 percent by weight fibrous material.

14. The composition of claim 1 wherein the siliceous reinforcing material is asbestos in fibrous form.

15. A fused composition consisting essentially of from about 10 to about 90 percent by weight of fused polymer solids of a thermoplastic latex copolymer of an unsaturated free-radical polymerizable non-acidic monomer and an unsaturated free-radical polymerizable mono-carboxy acid, said acid being present in said latex in the amount of from about 0.5 to about 10 percent by weight based on polymer solids, from about 90 percent to about 10 percent by weight siliceous reinforcing material, and from a few parts per million to about 5 percent by weight of an aminosilane coupling agent, an amine group of which coupling agent forms a reaction product with an available carboxy group of said copolymer.

16. The composition of claim 15 wherein the non-acidic monomer is monomer selected from the group which consists of styrene, alpha-methyl styrene, vinyl toluene, chlorostyrene, dichlorostyrene, acenaphthylene, acrylonitrile, methacrylonitrile, butadiene, isoprene, chloroprene, vinyl acetate, vinyl chloride, ethylene, vinylidene chloride, vinyl fluoride, vinylidene fluoride, tetrafluoroethylene, methyl methacrylate, ethyl acrylate, and methyl acrylate.

17. The composition of claim 15 wherein the non-acidic monomer is a combination of monomers selected from the group which consists of styrene-acrylonitrile, styrene-methyl methacrylate, styrene-butadiene, acrylonitrile-butadiene-styrene, acrylonitrile-butadiene, vinyl acetate-vinyl chloride, ethylene-vinyl acetate, ethylene-vinyl chloride, and chloroprene-acrylonitrile.

18. The composition of claim 15 wherein the unsaturated free-radical polymerizable carboxy acid is selected from the group which consists of methacrylic acid, acrylic acid, itaconic acid, phenyl crotonic acid, a monoester of fumaric acid, and a monoester of maleic acid.

19. The composition of claim 15 wherein the unsaturated free-radical polymerizable carboxy acid is present in the amount of from about 0.5 to about 10 percent by weight of the polymer solids.

20. The composition of claim 15 wherein the thermoplastic latex copolymer has a glass transition temperature of at least 100° C.

21. The composition of claim 15 wherein the coupling agent has the formula

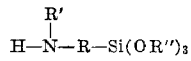

wherein R is $(CH_2)_n$ and $n$ is an integer from 1 to 6, R' is selected from the group which consists of hydrogen, $CH_3(CH_2)_m$ where $m$ is an integer from 0 to 12, a phenyl group, a phenyl group substituted with an alkyl group, a phenyl group substituted with a naphthyl group and an alkylene amino group containing from 1 to 10 carbon atoms, and R'' is $CH_3(CH_2)_p$ where $p$ is an integer from 0 to 3.

22. The composition of claim 15 wherein the coupling agent is selected from the group which consists of 3-aminopropyl triethoxysilane, N-trimethoxysilylpropyl amine-N(β-aminoethyl) amine and N-trimethoxysilylundecyl amine.

23. The composition of claim 15 wherein the coupling agent is present in the amount of from about 0.01 to about 3 parts by weight per 100 parts by weight of siliceous reinforcing material.

24. The composition of claim 15 wherein the siliceous reinforcing material has a dimension less than about 0.05 inch.

25. The composition of claim 15 wherein the siliceous reinforcing material is in fibrous form having fibers from about 0.1 to about 1 inch in length.

26. The composition of claim 15 wherein the siliceous reinforcing material is in particulate form.

27. The composition of claim 15 wherein the siliceous reinforcing material comprises from about 10 to about 90 percent by weight particulate material and from about 90 percent to about 10 percent by weight fibrous material.

28. The composition of claim 15 wherein the siliceous reinforcing material is asbestos in fibrous form.

29. A composition consisting essentially of from about 30 to about 70 percent by weight of fused polymer solids of a thermoplastic latex copolymer of an unsaturated free-radical polymerizable non-acidic monomer which is selected from the group which consists of styrene, methyl methacrylate and a combination of styrene and acrylonitrile and from about 1.5 to about 3 percent by weight, based on polymer solids, of an unsautrated free-radical polymerizable mono-carboxy acid which is selected from the group which consists of methacrylic acid, a monoester of fumaric acid and a monoester of maleic acid which thermoplastic latex copolymer has a glass transition temperature of at least 100° C., an aminosilane coupling agent which is selected from the group which consists of 3-aminopropyl triethoxysilane, N-trimethoxysilylpropyl-N($\beta$-aminoethyl) amine and N-trimethoxysilylundecyl amine in the amount of from about 0.2 to about 1.0 parts per hundred by weight of asbestos reinforcing material, and from about 70 percent to about 30 percent by weight of an asbestos reinforcing material in fibrous form having a dimension less than about 0.05 inch and from about 0.1 to about 1 inch in length wherein said composition, an amine group of said coupling agent forms a reaction product with a carboxyl group of said copolymer.

References Cited

UNITED STATES PATENTS

| | | | |
|---|---|---|---|
| 3,116,192 | 12/1963 | Eilerman | 156—167 |
| 3,169,884 | 2/1965 | Marzocchi et al. | 117—126 |
| 3,249,411 | 5/1966 | McWilliams et al. | 65—3 |

HAROLD D. ANDERSON, Primary Examiner

U.S. Cl. X.R.

117—123 D, 161 UZ; 260—29.6 F, 29.6 TA, 29.7 N, 41 R, 41.5 R